United States Patent
Duda

(10) Patent No.: US 11,108,696 B2
(45) Date of Patent: *Aug. 31, 2021

(54) NEXT HOP GROUPS

(71) Applicant: Arista Networks, Inc., Santa Clara, CA (US)

(72) Inventor: Kenneth James Duda, Santa Clara, CA (US)

(73) Assignee: Arista Networks, Inc., Santa Clara, CA (US)

(*) Notice: Subject to any disclaimer, the term of this patent is extended or adjusted under 35 U.S.C. 154(b) by 94 days.

This patent is subject to a terminal disclaimer.

(21) Appl. No.: 16/521,098

(22) Filed: Jul. 24, 2019

(65) Prior Publication Data

US 2019/0349304 A1    Nov. 14, 2019

Related U.S. Application Data

(63) Continuation of application No. 15/066,913, filed on Mar. 10, 2016, now Pat. No. 10,412,009.

(51) Int. Cl.
| | |
|---|---|
| *H04L 12/801* | (2013.01) |
| *H04L 12/741* | (2013.01) |
| *H04L 12/851* | (2013.01) |
| *H04L 29/12* | (2006.01) |

(52) U.S. Cl.
CPC .............. *H04L 47/17* (2013.01); *H04L 45/54* (2013.01); *H04L 47/2441* (2013.01); *H04L 61/6022* (2013.01)

(58) Field of Classification Search
CPC ......... H04L 45/02; H04L 45/20; H04L 45/50; H04L 45/54; H04L 47/17; H04L 47/2441; H04L 61/6022; H04L 61/103
See application file for complete search history.

(56) References Cited

U.S. PATENT DOCUMENTS

| | | | |
|---|---|---|---|
| 9,705,798 B1* | 7/2017 | Abts | ...................... H04L 47/122 |
| 2004/0133619 A1* | 7/2004 | Zelig | ................... H04L 12/4641 709/200 |
| 2007/0177622 A1 | 8/2007 | Kim | |
| 2009/0296579 A1* | 12/2009 | Dharwadkar | ....... H04L 12/4641 370/235 |
| 2016/0352619 A1 | 12/2016 | Gattani | |
| 2017/0019271 A1 | 1/2017 | Li et al. | |

* cited by examiner

*Primary Examiner* — Jianye Wu
(74) *Attorney, Agent, or Firm* — Chamberlain, Hrdlicka, White, Williams & Aughtry

(57) ABSTRACT

In general, the invention relates to a method for programming a network device to perform routing of data packets between and/or within networks. More specifically, the method provides a more efficient process for updating the forwarding equivalence class (FEC) table with minimal impacting of the mappings in the forward information base (FIB) of the network device.

25 Claims, 11 Drawing Sheets

FIG. 8B — FIB

| Prefix | FEC Index |
|---|---|
| P1 | F1 |
| P2 | F2 |
|  |  |

FIG. 8C — FEC Table

| FEC Index | NHG |
|---|---|
| F1 | G1 |
| F2 | G2 |
|  |  |

FIG. 8D — Next Hop Group G1

| Entry | NH |
|---|---|
| 1 | A |
| 2 | C |
| 3 | D |
| 4 | C |
| 5 | A |
| 6 | D |
| 7 | A |
| 8 | C |
| 9 | D |
| 10 | C |
| 11 | A |
| 12 | D |

FIG. 8E — Next Hop Group G2

| Entry | NH |
|---|---|
| 1 | B |
| 2 | B |
| 3 | B |
| 4 | B |
| 5 | B |
| 6 | B |
| 7 | B |
| 8 | B |
| 9 | B |
| 10 | B |
| 11 | B |
| 12 | B |

NEXT HOP GROUPS

BACKGROUND

Network devices (e.g., routers, multilayer switches) include functionality to route and/or forward network traffic. As the network topology changes, the network devices need to take setups to update the manner in which they route and/or forward traffic in order to take into account the network topology changes. In handling such changes, the network devices that are connected to a failed network device need to update routing and forwarding information to take into account the changes in network topology. Traditional mechanisms to update the network devices require significant overhead to implement and may result in loss of network traffic while the network device is being updated.

SUMMARY

In general, in one aspect, the invention relates to a method for programming a network device, comprising selecting a route from the routing information base (RIB) of the network device, performing a next hop resolution, for the selected route, to obtain next hop information (NHI), performing a comparison between the obtained NHI and a next hop group (NHG), and updating, based on the comparison, the forwarding information base (FIB) of the network device.

In general, in one aspect, the invention relates to a non-transitory computer readable medium comprising instructions that enable a network device to select a route from the routing information base (RIB), perform a next hop resolution, for the selected route, to obtain next hop information (NHI), perform a comparison between the obtained NHI and a next hop group (NHG), and update, based on the comparison, the forwarding information base (FIB).

In general, in one aspect, the invention relates to a network device comprising a routing information base (RIB), a forwarding information base (FIB), and a network hop group (NHG), wherein the network device selects a route from the RIB, wherein the network device performs a next hop resolution, for the selected route, to obtain next hop information (NHI), wherein the network device performs a comparison between the obtained NHI and a NHG, and wherein the network device updates, based on the comparison, the FIB.

In general, in one aspect, the invention relates to a method for programming a network device, comprising identifying a set of next hop entries (NHEs) to remove from a next hop group (NHG), determining at least one valid NHE to replace the NHEs in the set of NHEs, replacing each NHE in the set the NHEs with a valid NHE to obtain an updated NHG, and transmitting at least one packet using the updated NHG.

In general, in one aspect, the invention relates to a method for programming a network device, comprising creating a next hop group (NHG), populating the NHG with at least one next hop entry (NHE), associating the NHG with a forward equivalence class (FEC) index, and associating the FEC index with a network prefix, and after associating the FEC index with a network prefix, transmitting at least one packet using the NHG.

Other aspects of the invention will be apparent from the following description and the appended claims.

BRIEF DESCRIPTION OF DRAWINGS

FIG. 8B shows an exemplary forwarding information base (FIB) table in accordance with one or more embodiments of the invention.

FIG. 8C shows an exemplary forwarding equivalence class (FEC) table in accordance with one or more embodiments of the invention.

FIG. 8D shows an exemplary next hop group (NHG) in accordance with one or more embodiments of the invention.

FIG. 8E shows an exemplary next hop group (NHG) in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-9E, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method for programming a network device to perform routing of data packets between and/or within networks. More specifically, embodiments of the invention provide a more efficient process for updating the forwarding equivalence class (FEC) table with minimal impacting the mappings in the FIB.

Figure 1:
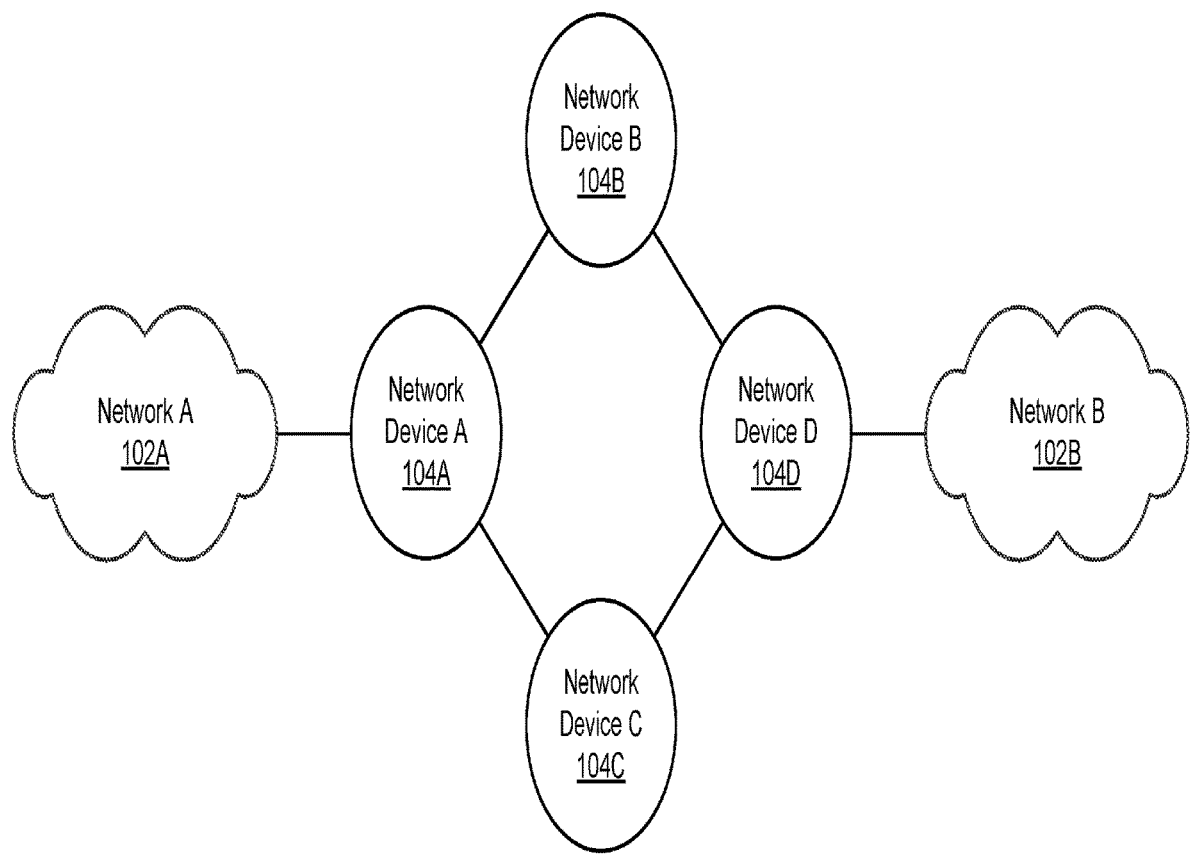
FIG. 1 shows a system in accordance with one or more embodiments of the invention.

FIG. 1 shows a system in accordance with one or more embodiments of the invention. The system includes networks (102A, 102B) operatively connected to one another. In one embodiment of the invention, a network (102A, 102B) refers to a collection of interconnected computing devices (not shown) that communicate and share resources amongst one another. Further, computing devices in one network (102A) may need to communicate, thus enabling the exchange of data packets, with computing devices residing in another network (102B). To facilitate this exchange of data packets between computing devices on different networks, network traffic is transmitted through multiple network devices (104A-104D) along a diversity of routes to arrive at respective destinations. The aforementioned components may be directly or indirectly connected to each other using any combination of wired or wireless connections. Further, the aforementioned components may communicate with each other using any combination of wired and/or wireless communication protocols. Network devices (104A-104D) are described in further detail below.

In one embodiment of the invention, a network device (104A-104D) is a physical device that includes persistent storage, memory (e.g., Random Access Memory), one or more processors (which may include a switch chip), and two or more physical ports. In one or more embodiments of the invention, the switch chip is hardware that determines which egress port on a switch to forward media access control (MAC) frames. The switch chip may include egress and ingress ports that may connect to ports on the switch. Each port may or may not be connected to another device on a network (e.g., a server, a switch, a router, etc.). The network device may be configured to receive packets via the ports and determine whether to (i) drop the packet, (ii) process the packet in accordance with one or more embodiments of the invention, and/or (iii) send the packet, based on the processing, out another port of the network device.

How the network device makes the determination whether to drop the packet, and/or send the packet to another device on the network depends, in part, on whether the network device is a layer-2 (L2) switch or a layer-3 (L3) switch (also referred to as a multi-layer switch), which may perform at least some functions of a router. If the network device is operating as a L2 switch, the network device uses the destination MAC address along with a forwarding table to determine out of which port to send the packet. If the network device is operating as a L3 switch, the network device uses the destination IP address along with a routing table to determine out of which port to send the packet, and includes the ability to write the MAC address of the next device to receive the packet in place of its own MAC address (which the last device to send the packet wrote) in the L2 information encapsulating the packet. If the network device is a multilayer switch, the multilayer switch includes functionality to process packets using both MAC addresses and IP addresses.

In one embodiment of the invention, the persistent storage in the network device may include any type of non-transitory computer readable medium that includes instructions, which, when executed by one or more processors in the network device, enable the network device to perform the functions described in accordance with one or more embodiments of the invention (see e.g., FIGS. 2A-9E).

The invention is not limited to the system architecture shown in FIG. 1.

Figure 2A:
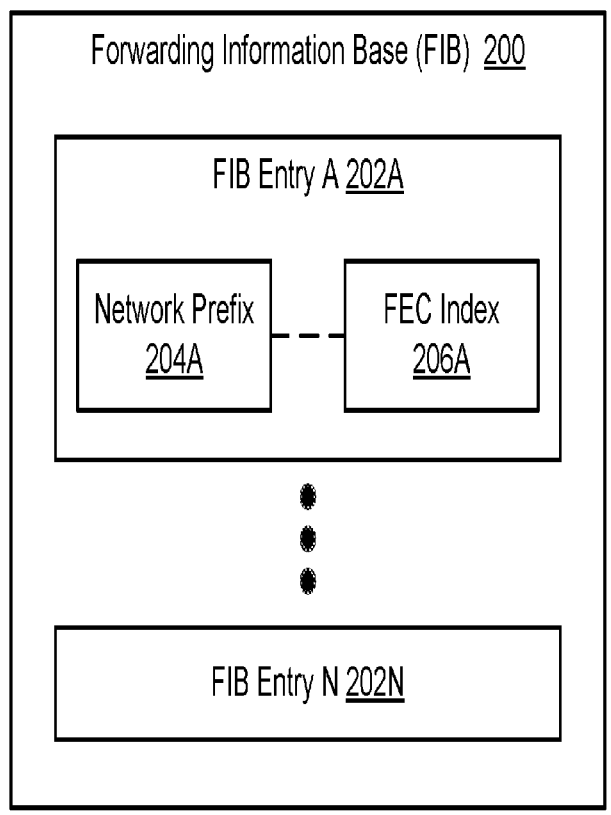
FIG. 2A shows a forwarding information base (FIB) in accordance with one or more embodiments of the invention.

FIG. 2A shows a forwarding information base (FIB) in accordance with one or more embodiments of the invention. The FIB (200) is a hardware-implemented database that includes FIB entries (202A, 202N) to be used by a network device for transmitting received traffic. In one embodiment of the invention, FIB entries in the FIB may be programmed by the network device based on route entries stored in the routing information base (RIB) (not shown). Further, the network device may select a set of FIB entries from the routes stored in the RIB, and may write the selected FIB entries to the FIB (discussed below, see e.g., FIG. 3). In one embodiment of the invention, a set of FIB entries may be written to the FIB (200) during initialization of the network device or, for example, after powering on the network device. Additionally, the FIB may be updated periodically by writing or deleting complete sets of FIB entries, individual FIB entries, or groups of FIB entries while the network device is operating.

Continuing discussion of FIG. 2A, the FIB (200), accordingly, includes one or more FIB entries (202A, 202N), where each may be associated with a corresponding route in the RIB. In one embodiment of the invention, each FIB entry (202A, 202N), in turn, includes a network prefix (204A) and a forwarding equivalence class (FEC) index (206A). The network prefix (204A) pertains to a reachable destination network (see e.g., 102A and 102B in FIG. 1) that the route, associated with the FIB entry (202A, 202N), is used for in order to deliver packets through and towards a destination. An example of a network prefix is 198.168.1.0/24. Continuing with the discussion of FIG. 2A, the FEC index (206A) references an entry in the FEC table (see e.g., FIG. 2B) that permits the network prefix (and/or route) to associate with a next hop group (NHG) (discussed below). In one embodiment of the invention, different network prefixes, and hence, multiple FIB entries, may correspond to and/or include the same FEC index. In other words, one or more network prefixes may be associated with a same reachable destination network; and may thus be associated with the same NHG.

Figure 2B:
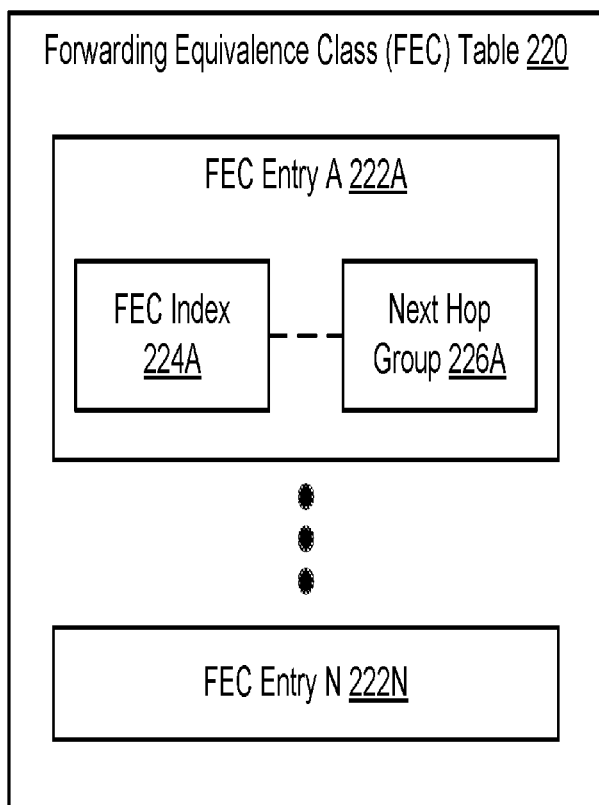
FIG. 2B shows a forward equivalence class (FEC) table in accordance with one or more embodiments of the invention.

FIG. 2B shows a forwarding equivalence class (FEC) table in accordance with one or more embodiments of the invention. The FEC table (220) is a hardware-implemented database that includes entries that include information necessary for a network device to forward an incoming packet toward the packet's destination. In view of this, the FEC table includes one or more FEC entries (222A, 222N). In one embodiment of the invention, a FEC entry (222A, 222N) may be programmed by the network device based on the allocation or deallocation of a next hop group (NHG). That is to say, the FEC table (220) may be updated on occasion, by, or more specifically, in response to, the creation and deletion of NHGs.

In one embodiment of the invention, each of the one or more FEC entries (222A, 222N) includes a FEC index (224A) and a NHG (226A). With regards to each FEC entry, the FEC index (224A) serves as an identifier to that FEC entry (222A) in which the FEC index is residing. Such an identifier may be used when performing lookups on the forwarding information base (FIB) (see e.g., FIG. 2A), thereby associating a particular FEC entry, containing specific forwarding information, to a network prefix. In one embodiment of the invention, the FEC index in a FIB entry (see e.g., 206A in FIG. 2A) corresponds to a FEC index (224A) in a FEC entry (222A). The next hop group (NHG) (226A) retains the forwarding information, and is described in further detail below.

Figure 2C:
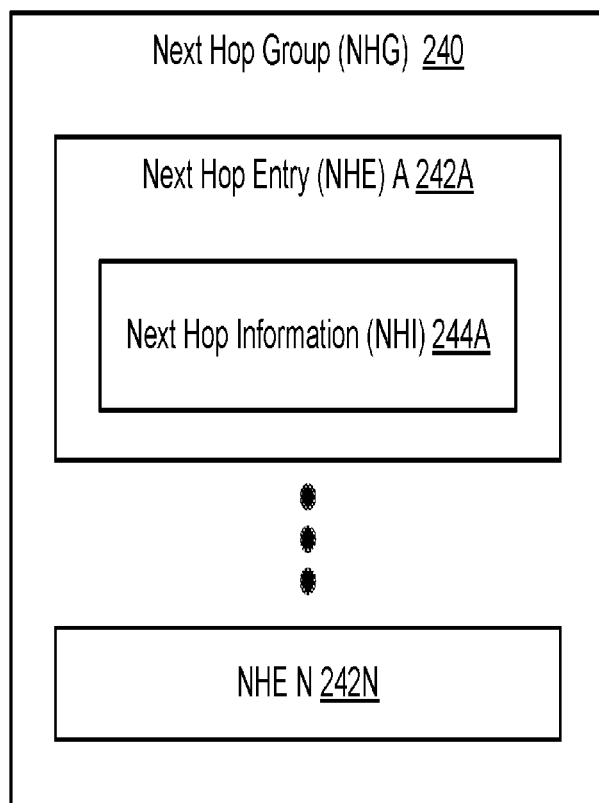
FIG. 2C shows a next hop group (NHG) in accordance with one or more embodiments of the invention.

FIG. 2C shows a next hop group (NHG) in accordance with one or more embodiments of the invention. A NHG (240) may be referred to as an associative mapping table that includes forwarding information pertaining to next hops along routes to a reachable destination network. More specifically, a NHG (240) may be a table of tuples of forwarding information, where each entry corresponds to a next hop to which a data packet is forwarded, based on the hashing (e.g., modulo hashing), performed by the processing network device, of at least a portion of the Internet Protocol (IP) header of the data packet.

Subsequently, in one embodiment of the invention, a NHG (240) includes two or more next hop entries (NHEs) (242A, 242N). The number of NHEs in a NHG (e.g., the size of the NHG) may be substantially larger than the potential number of next hops to forward traffic across, this may enable equal load balancing amongst the available next hops within the NGH. In one embodiment of the invention, the NHG (240) may have a fixed size.

Proceeding with FIG. 2C, in one or more embodiments of the invention, a NHE (242A, 242N) includes a tuple of forwarding information, collectively referred to as next hop information (NHI) (244A). In one embodiment of the invention, the NHI (244A) may include, for example, the media access control (MAC) address associated with a next hop and a network interface (e.g., egress port) of the network device that connects to the next hop. In one embodiment of the invention, the NHI additionally includes the path cost corresponding to the route of which the next hop is associated.

In one embodiment of the invention, the NHI may also include a multiprotocol label switching (MPLS) push operation, thereby allowing traffic (e.g., packets) to be forwarded utilizing labels. In such an embodiment, NHI (within an NHE) associated with a MPLS push operation may include, for example, the Internet Protocol (IP) address associated with a next hop and a MPLS push operation specifying a label. In another embodiment of the invention, the NHI may include information pertaining to, and would provide the option for routing traffic based on, the generic routing encapsulation (GRE) tunneling protocol. In such an embodiment, NHI (within an NHE) associated with the GRE tunneling protocol may include, for example, an instruction specifying the routing of traffic, via GRE tunneling, towards a particular IP destination. Additional and/or alternative information that may facilitate the routing of traffic using any existing and/or later developed networking protocol may be included within NHIs without departing from the invention.

Figure 3:
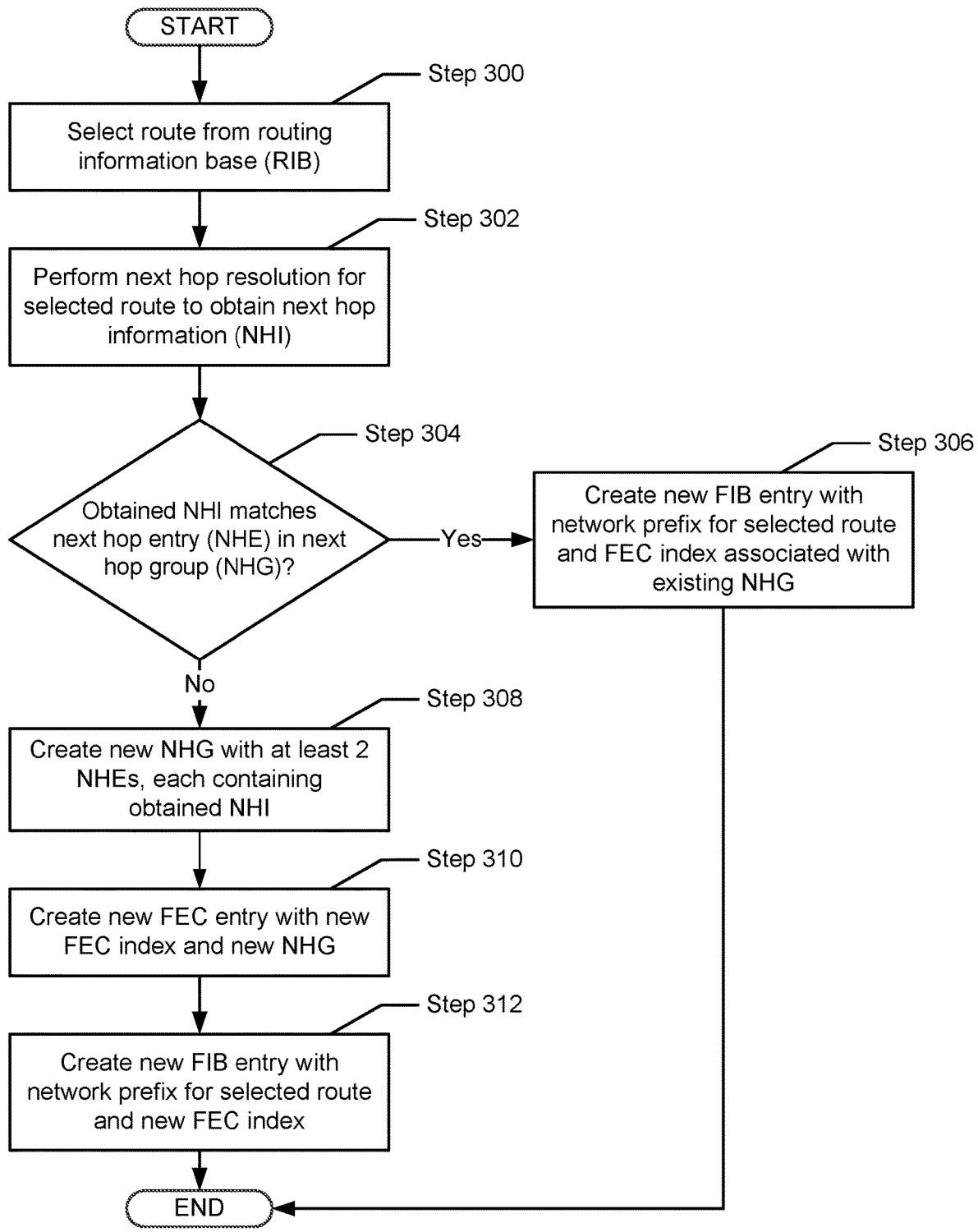
FIG. 3 shows a flowchart in accordance with one or more embodiments of the invention.
Figure 4:
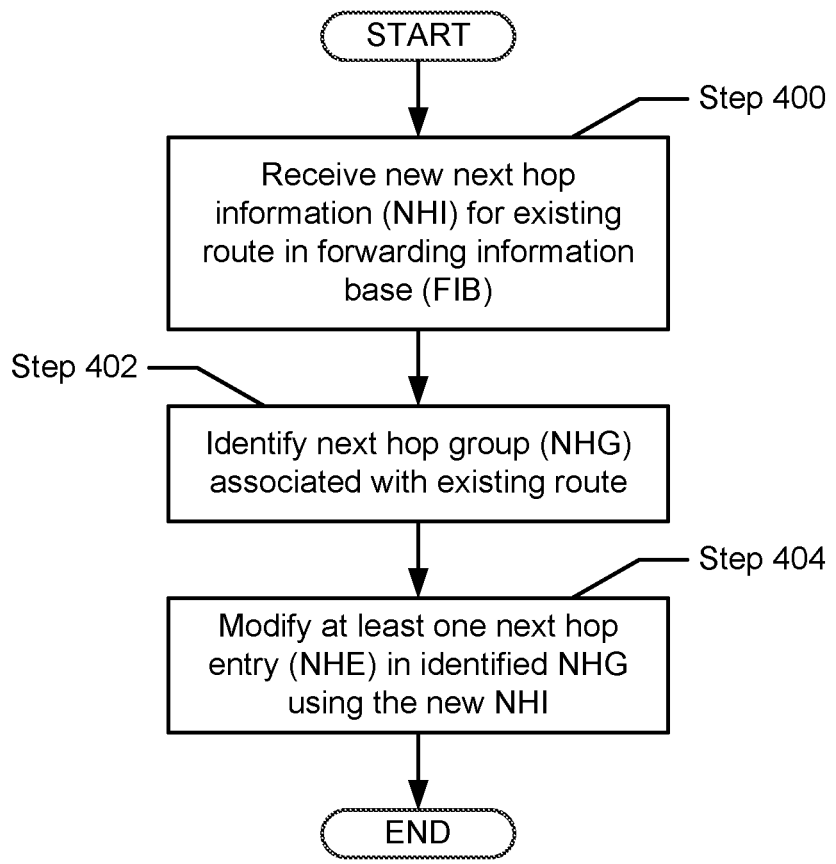
FIG. 4 shows a flowchart in accordance with one or more embodiments of the invention.
Figure 5:
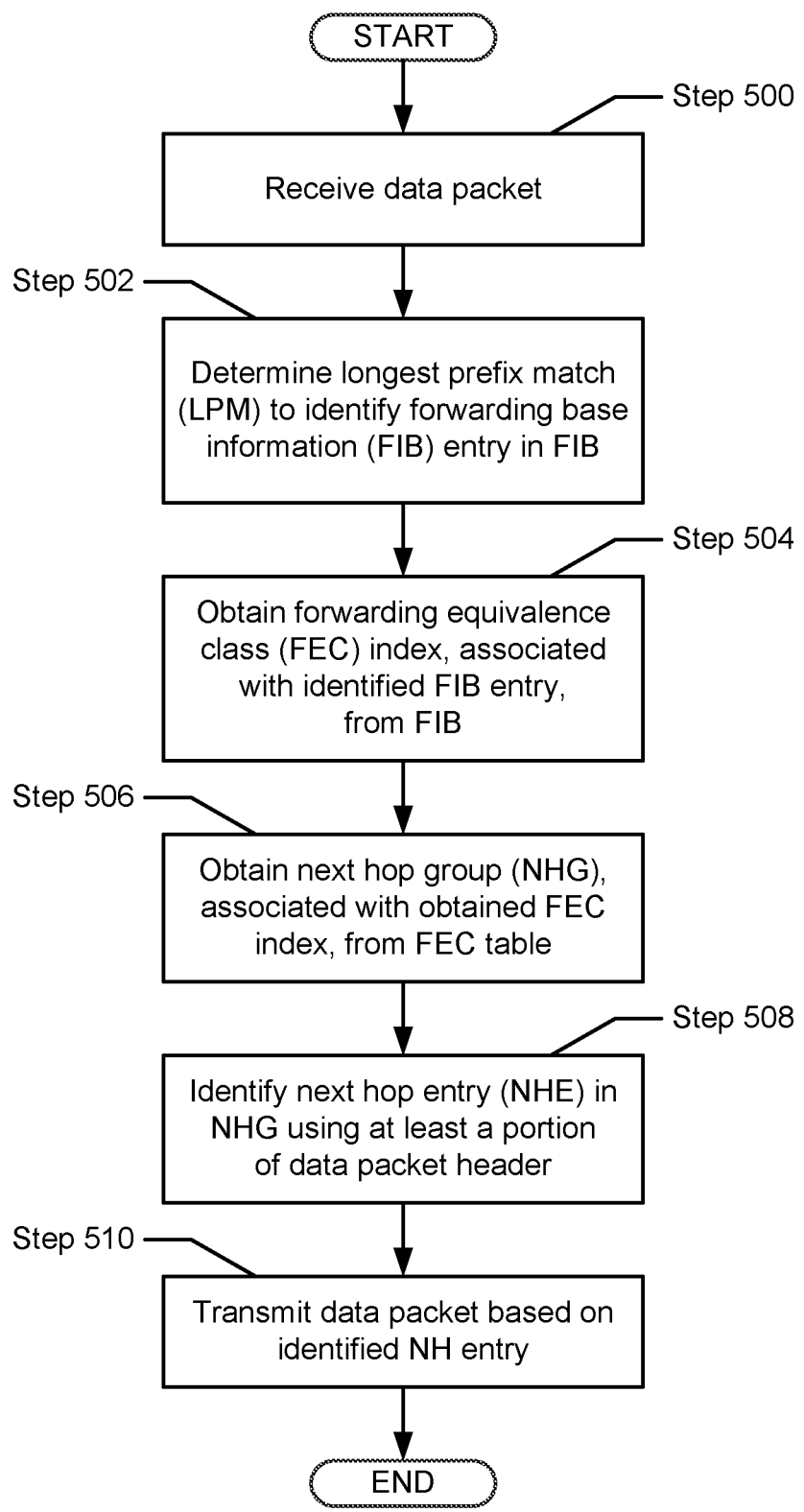
FIG. 5 shows a flowchart in accordance with one or more embodiments of the invention.

FIGS. 3-5 show flowcharts in accordance with one or more embodiments of the invention.

While the various steps in the flowcharts are presented and described sequentially, one or ordinary skill will appreciate that some or all of these steps may be executed in different orders, may be combined or omitted, and some or all of the steps may be executed in parallel. In one embodiments of the invention, the steps shown in FIGS. 3-5 may be performed in parallel with any other steps shown in FIGS. 3-5 without departing from the invention.

FIG. 3 shows a method for programming a route in the forwarding information base (FIB) of a network device in accordance with one or more embodiments of the invention. In Step 300, a route is selected from the routing information base (RIB) on the network device. As mentioned above, the selected route may be one of many routes that are to be written into the FIB. Further, in one embodiment of the invention, the selected route may qualify as an equal-cost multipath (ECMP) route.

In Step 302, a next hop resolution is performed for the route selected in Step 300, resulting in next hop information (NHI) being obtained. As discussed above, the obtained NHI may include information used by a network device to forward an incoming packet towards the packet's destination.

In Step 304, a comparison is performed between the NHI, obtained in Step 302, and the forwarding information amongst each of the existing (e.g., already allocated) next hop groups (NHGs) on the network device. More specifically, the obtained NHI is compared against the NHI of each next hop entry (NHE) in each NHG. If the result of the comparison determines that the obtained NHI matches a NHE in a NHG, the process proceeds to Step 306; otherwise, if the result of the comparison determines that the obtained NHI does not match any NHE in all of the existing NHGs, then the process proceeds to Step 308.

In Step 306, upon determining that the obtained NHI (Step 302) matches a NHE in a NHG on the network device, a new forwarding information base (FIB) entry is created and stored in the FIB of the network device. The new FIB entry includes the network prefix for the route selected in Step 300, and the forwarding equivalence class (FEC) index associated with the NHG containing the matched NHE. In one embodiment of the invention, once a NHE is matched, the corresponding NHG can be readily identified by determining in which NHG the matched NHE resides. Subsequently, in one embodiment of the invention, a reverse lookup may be performed using the FEC table (see e.g., FIG. 2B) on the network device, to identify the FEC index (see 224A in FIG. 2B) associated with the identified NHG.

Alternatively, in Step 308, upon determining that the obtained NHI does not match any of the NHEs across all of the NHGs on the network device, a new NHG is created that includes the obtained NHI. More specifically, in one embodiment of the invention, when a new NHG is created, at least two new NHEs are created, constituting a minimal definition for a collection of next hops in the new NHG. Furthermore, each newly created NHE stores a copy of the obtained NHI.

In Step 310, a new FEC entry (see e.g., 222N in FIG. 2B) is created and stored in the FEC table of the network device. The new FEC entry includes the new NHG, created in Step 308, and a new FEC index. In Step 312, a new FIB entry is created and stored in the FIB of the network device. The new FIB entry includes the network prefix for the route selected in Step 300, and the new FEC index created in Step 310.

In one embodiment of the invention, new NHGs may be created outside of following the method outlined in FIG. 3. More specifically, in one embodiment of the invention, a new NHG may be created via manual input from a network device administrator (or from another external source). In such an embodiment, the network device administrator may explicitly configure a new NHG and subsequently, populate the FEC and FIB tables so that the new NHG may be associated with one or more static routes (e.g., network prefix(es)). In one embodiment of the invention, the network administrator may further associate (or identify) the new NHG with a custom name and/or number.

FIG. 4 shows a method for updating next hop groups in accordance with one or more embodiments of the invention. In Step 400, new NHI is resolved for a route selected from the routing information base (RIB). Further, it is determined that the new NHI is associated with a FIB entry that that is already programmed into the FIB of the network device. In one embodiment of the invention, this determination may be achieved by, for example, comparing the route (or network prefix) associated with the new NHI against the network prefix associated with each of the existing FIB entries (see e.g., 202A and 202N of FIG. 2A) of the FIB until a matching network prefix, and consequently, an existing FIB entry, is identified.

In Step 402, the next hop group (NHG) associated with the existing route (as well as the new NHI) is identified. In one embodiment of the invention, the NHG is identified by, first, identifying the FEC index associated with the existing route (e.g., existing FIB entry). Appropriately, the associated FEC index may be determined by performing a lookup on the FIB using the network prefix associated with the new NHI received in Step 400. Upon determining the FEC index, the FEC index may subsequently be used in a lookup on the FEC table (see e.g., FIG. 2B) to obtain the corresponding NHG.

In Step 404, at least one next hop entry (NHE) in the NHG, identified in Step 402, is modified using the new NHI, received in Step 400. In one embodiment of the invention, a modification refers to including an additional next hop, with equal path cost to the NHEs, in the identified NHG. In another embodiment of the invention, a modification may refer to removing a next hop, indicative of a failed network device, from the identified NHG. When considering the former scenario, the forwarding information associated with the additional next hop (e.g., the new NHI) may be introduced into the NHEs of the identified NHG so as to preserve traffic load balancing. In conjunction with a fixed ECMP set size (discussed above), the introduction of the new NHI avoids scrambling, and thereby impacts an equal (or substantially equal) portion of the traffic consistently.

For example, introduction of a next hop into a NHG of 100 NHEs, that includes forwarding information associated with one existing next hop impacts half the traffic (i.e., 50 out of the NHEs are updated with the new forwarding information). Similarly, when a third next hop is introduced into the aforementioned NHG, the introduction impacts only a third of the network traffic, and so on. When considering the latter scenario—the deletion of a next hop in a NHG due to failure of a network device—first, all NHEs that match the NHI of the failed network device is removed, leaving empty entries. Subsequently, an equal (or substantially equal) distribution of the remaining next hops, in the NHG, is disseminated amongst the empty NHEs. The order that which the remaining next hops occupy the empty NHEs may be selected at random or may be selected in another manner without departing from the invention.

In one embodiment of the invention, when one or more NHE(s) become empty (or invalid), the NHE(s) may be repopulated using the NHI associated with another next hop in the NHG. In one embodiment of the invention, another (or remaining) next hop may be considered a candidate for repopulating an empty (or invalid) NHE after a validity test is performed using the corresponding NHI. In such an embodiment, determining the validity of a next hop may include considering, for example, the reachability of a GRE tunnel destination, the successful address resolution protocol (ARP) reply from an immediate next hop, or verification that the next hop interface is enabled. Additional and/or alternative considerations may be exercised in determining the validity of a next hop without departing from the invention. Moreover, in one embodiment of the invention, the selecting of which valid next hop to repopulate an empty (or invalid) NHE may further be based on maintaining traffic load balancing between the remaining NHEs in the NHG with valid NHI.

By way of an example, consider a NHG with 120 NHEs, each of which have NHI associated with one of four next hops (hereinafter referred to as next hops A, B, C, and D). Following the introduction of the four next hops per the method described in FIG. 4, next hops A, B, C, and D are distributed as equally as possible in order to preserve traffic load balancing. As such, NHI associated with each of the four next hops are included in 30 of the 120 NHEs. From here, suppose deletion of next hop B is necessary because the next hop has failed in some respect. Accordingly, the NHI associated with next hop B, which is included in 30 of the NHEs is removed, thereby rendering those 30 NHEs empty. As a next step, valid NHI, corresponding to a valid next hop, needs to be selected in order to repopulate the 30 empty NHEs. Subsequently, a validity test (e.g., via an ARP request) is performed for each of the remaining next hops in the NHG—next hops A, C, and D. In failing to receive an ARP reply from next hop D, next hop D is deemed invalid and the 30 NHEs which included the NHI associated with next hop D also become empty as a result. Alternatively, ARP replies were successfully received from next hops A and C, thus next hops A and C are considered valid. At this point, half (e.g., 30 from next hop B and 30 from next hop D) of the original 120 NHEs are empty. Confirming that the remaining next hops (e.g., next hops A and C) in the NHG are valid, the 60 empty NHEs are repopulated using a distribution of the remaining valid next hops (i.e., next hops A and C). In one embodiment of the invention, this distribution may be selected based on maintaining traffic load balancing between the remaining (and valid) next hops A and C. In such an embodiment, 30 of the 60 empty NHEs may be repopulated using NHI associated with next hop A, and the other 30 of the 60 empty NHEs may be repopulated using NHI associated with next hop C. Through modification of the NHG per this example, the original NHG that contained 30 NHEs pertaining to each of next hops A, B, C, and D, now contains 60 NHEs associated with the each of the remaining and valid next hops A and C.

FIG. 5 shows a method for processing data packets, by a network device, in conjunction with next hop groups, as well as ECMP, in accordance with one or more embodiments of the invention. In Step 500, a data packet is received. In one embodiment of the invention, the data packet may be received directly from a computing device (e.g., desktop computer, laptop computer, server, etc.) belonging to a source network or data center. In another embodiment of the invention, the data packet may be received directly from another network device (e.g., multilayer switch, router, etc.) where the received data packet underwent a similar process that ultimately forwarded the data packet to the current network device.

In Step 502, a longest prefix match (LPM) is determined, for example, utilizing the destination Internet Protocol (IP) address included in the IP header of the received data packet. The result of the LPM identifies a forwarding information base (FIB) entry, and hence, a route, best suited for the optimal transmittal of the data packet towards its destination. In Step 504, a lookup is performed on the FIB utilizing the route (e.g., the network prefix, the FIB entry) identified in Step 502. From the lookup, a forwarding equivalence class (FEC) index is obtained from the identified FIB entry.

In Step 506, the FEC index, obtained in Step 504, in one embodiment of the invention, is used to perform a lookup in the FEC table. The next hop group (NHG), that includes the necessary forwarding information, is obtained as a result of the lookup. In Step 508, using at least a portion of the IP header of the received data packet, a hashing function, for example, modulo hashing, is performed in order to identify a NHE in the NHG. Finally, in Step 510, the data packet is forwarded along the route, identified in Step 502, through a next hop associated with the NHE identified in Step 508.

The following example is for explanatory purposes only and not intended to limit the scope of the invention.

Regarding the example to follow, FIGS. 6A, 7A, 8A and 9A show an exemplary system, amongst different stages of implementation, in accordance with one or more embodiments of the invention. Referring to each of the different aforementioned implementation stages: FIGS. 6B, 7B, 8B, and 9B show an exemplary forwarding information base (FIB) in accordance with one or more embodiments of the invention; FIGS. 6C, 7C, 8C, and 9C show an exemplary forwarding equivalence class (FEC) table in accordance with one or more embodiments of the invention; FIGS. 6D, 7D, 8D, and 9D show an exemplary next hop group (NHG) in accordance with one or more embodiments of the invention; and FIGS. 6E, 7E, 8E, and 9E show another exemplary NHG (e.g., distinct from the NHG associated with the previous set of corresponding figures) in accordance with one or more embodiments of the invention.

Figures 6A, 6B, 6C, 6D, 6E:
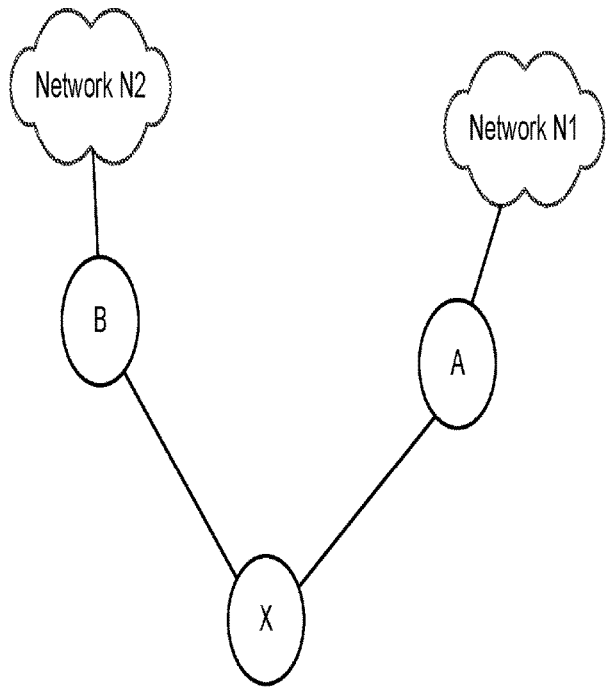
FIG. 6A shows an exemplary system in accordance with one or more embodiments of the invention.
FIG. 6B shows an exemplary forwarding information base (FIB) table in accordance with one or more embodiments of the invention.
FIG. 6C shows an exemplary forwarding equivalence class (FEC) table in accordance with one or more embodiments of the invention.
FIG. 6D shows an exemplary next hop group (NHG) in accordance with one or more embodiments of the invention.
FIG. 6E shows an exemplary next hop group (NHG) in accordance with one or more embodiments of the invention.

Turning to FIGS. 6A-6E, FIGS. 6A-6E show the exemplary initial state of the respective aforementioned components. More specifically, FIG. 6A shows the initial configuration of the exemplary system. The system includes a route-deciding network device X, hereafter referred as the network device, operatively connected to two reachable destination networks N1 and N2. In one or more embodiments of the invention, utilizing the methods discussed above (see e.g., FIGS. 3-5), the network device directs network traffic (e.g., data packets) through two available routes, permitting data packets to reach destinations either in network N1 or network N2. Furthermore, currently, data packets may reach a destination in network N1 by being forwarded to a network device, hereafter referred as next hop A, along the available route towards network N1. Alternatively, data packets may reach a destination in network N2 by being forwarded to a network device, hereafter referred as next hop B, along the available route towards network N2.

Subsequently, FIGS. 6B-6E show the state of the FIB, the FEC table, and NHGs G1 and G2, respectively, in accordance with the initial system configuration shown in FIG. 6A. Based on FIG. 6A, two routes have been established: (i) one route through next hop A towards network N1, hereafter referred as route N1; and (ii) another route through next hop B towards network N2, hereafter referred as route N2. FIG. 6B shows the recording of these two routes as two FIB entries in the FIB. As discussed above, each FIB entry includes a network prefix, associated with a route leading to a multitude of destination IP addresses within a respective network, and a FEC index that ties the route to a NHG via the FEC table. In this example, route N1 is shown in the FIB as being associated with a network prefix P1 and a FEC index F1. Additionally, route N2 is shown in the FIB as being associated with a network prefix P2 and a FEC index F2.

Continuing with the discussion, the initial state of the FEC table is portrayed in FIG. 6C. The FEC table, again, includes FEC entries, each associated with a FEC index that serves as a FEC entry identifier, and a NHG that includes a table of tuples containing forwarding information associated with next hops to which data packets are forwarded. Following the example, the FEC table includes two FEC entries, corresponding to the two FEC indices assigned to the two available routes shown in FIG. 6A, respectively. Furthermore, each FEC entry is assigned a NHG: (i) NHG G1 for route N1 associated with network prefix P1 and FEC index F1; and (ii) NHG G2 for route N2 associated with network prefix P2 and FEC index F2. Collectively, FIGS. 6B and 6C disclose the following information: (i) to reach a destination IP address, belonging to network N1, and hosting a longest prefix match (LPM) to network prefix P1, the network device (X), should forward relevant data packets to a next hop included amongst the fixed entries of NHG G1; similarly, (ii) to reach a destination IP address, belonging to network N2, and hosting a LPM to network prefix P2, the network device should forward data packets to a next hop included amongst the fixed entries of NHG G2.

FIGS. 6D and 6E are representative of NHGs G1 and G2 respectively. Each NHG, in this example, includes 12 next hop entries (NHEs). However, to preserve load balancing and prevent ECMP scrambling, the size of the NHG (e.g., number of NHEs) may be substantially larger than the potential number of next hops. Turning to FIG. 6D, only next hop A is presently available to direct data packets through, in association with route N1, therefore, all NHEs are populated with the next hop information (NHI) corresponding to next hop A. Similarly, because only next hop B is available to direct data packets through, in association with route N2, all NHEs in NHG G2, as illustrated in FIG. 6E, are populated with NHI pertaining to next hop B.

Figures 7A, 7B, 7C, 7D, 7E:
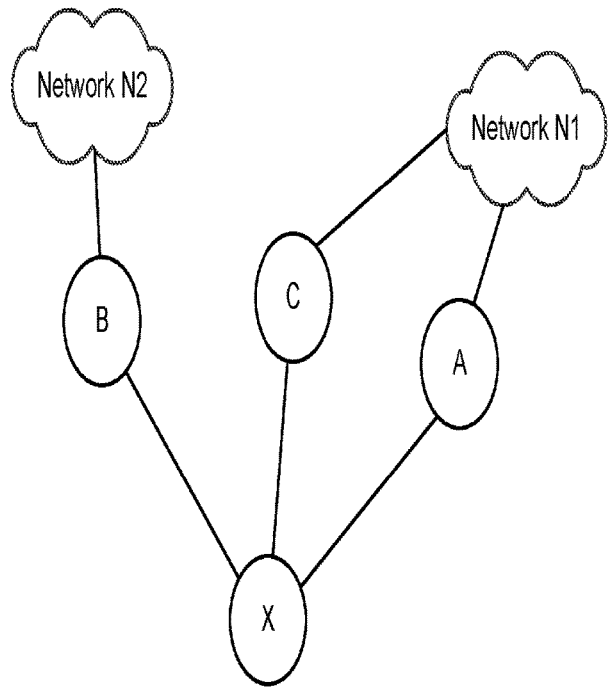
FIG. 7A shows an exemplary system in accordance with one or more embodiments of the invention.
FIG. 7B shows an exemplary forwarding information base (FIB) table in accordance with one or more embodiments of the invention.
FIG. 7C shows an exemplary forwarding equivalence class (FEC) table in accordance with one or more embodiments of the invention.
FIG. 7D shows an exemplary next hop group (NHG) in accordance with one or more embodiments of the invention.
FIG. 7E shows an exemplary next hop group (NHG) in accordance with one or more embodiments of the invention.

In FIGS. 7A-7E, a new network device, hereafter referred as next hop C, becomes available, through which data packets directed at network N1 may be forwarded. At this point, no new routes are selected, and next hop C is introduced into an existing NHG, therefore, the FIB and the FEC table represented by FIGS. 7B and 7C, respectively, remain unchanged. With next hop C being introduced for the route towards network N1, as shown in FIG. 7A, the NHG portrayed in FIG. 7D changes accordingly. More specifically, because a second next hop is introduced, every other NHE is rewritten with the NHI associated with next hop C. This action impacts only half the network traffic, accordingly, and retains load balancing across next hop A and next hop C. With no modifications to the route towards network N2, no modifications are made to the NHEs in NHG G2, as shown in FIG. 7E.

Figure 8A:
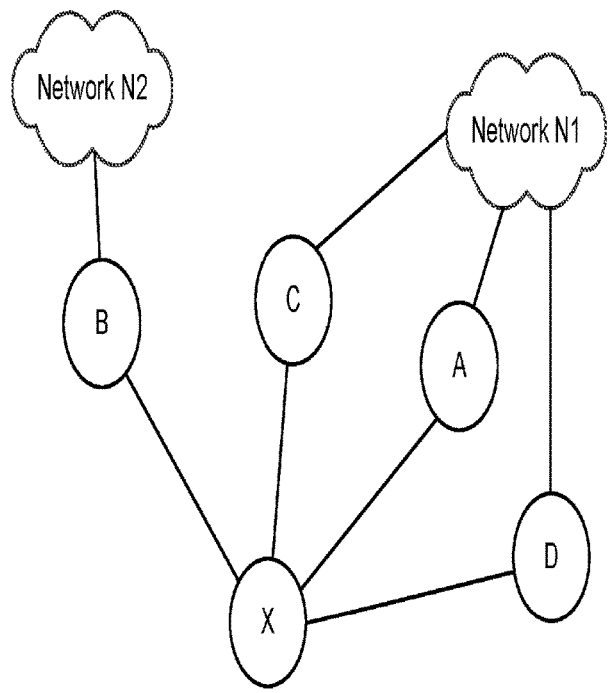
FIG. 8A shows an exemplary system in accordance with one or more embodiments of the invention.
Figures 9A, 9B, 9C, 9D, 9E:
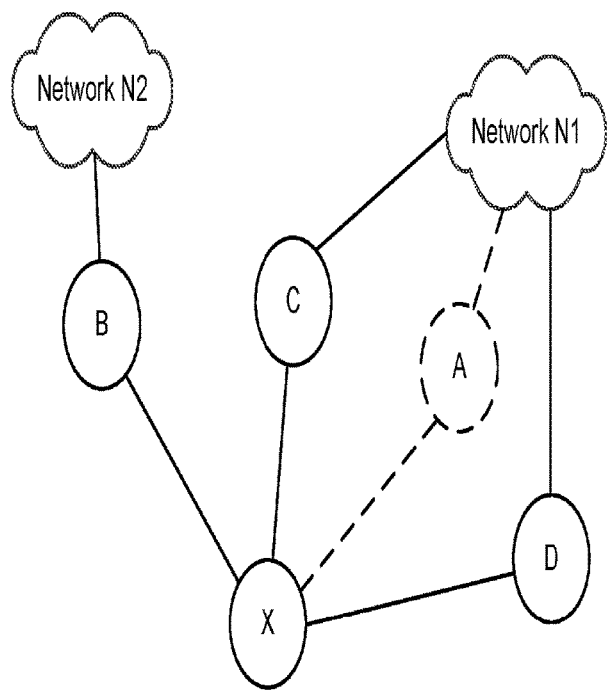
FIG. 9A shows an exemplary system in accordance with one or more embodiments of the invention.
FIG. 9B shows an exemplary forwarding information base (FIB) table in accordance with one or more embodiments of the invention.
FIG. 9C shows an exemplary forwarding equivalence class (FEC) table in accordance with one or more embodiments of the invention.
FIG. 9D shows an exemplary next hop group (NHG) in accordance with one or more embodiments of the invention.
FIG. 9E shows an exemplary next hop group (NHG) in accordance with one or more embodiments of the invention.

Similar to FIGS. 7A-7E, FIGS. 8A-8E relate to the availability of an additional network device, hereafter referred as next hop D, for the route towards network N1. Similarly, the FIB shown in FIG. 8B is unchanged, as well as the FEC table and NHG G2 shown in FIG. 8C and FIG. 8E, respectively. Modifications occur only to NHG G1, depicted by FIG. 8D, where the introduction of a third next hop rewrites every third NHE in the NHG with the NHI pertaining to next hop D. Again, the network traffic forwarded to each next hop (e.g., next hop A, next hop C, and next hop D) remains equally proportional.

In FIGS. 9A-9E, for some reason (i.e., network device failure), next hop A, associated with the route towards network N1, consequently must be removed from the corresponding NHG (e.g., NHG G1). As discussed above (see e.g., Step 404 in FIG. 4), modification to the NHG in this scenario includes removal of the NHI associated with next hop A from the NHEs. This initial stage of the modification leaves entries (e.g., NHEs 1, 5, 7, and 11) once occupied with next hop A NHI empty (not shown). Following this process, the remaining next hops (e.g., next hop C and next hop D) are rewritten across the empty entries equally. In the embodiment of the invention shown in FIG. 9D, NHEs 1, 5, 7 and 11 are populated with NHI pertaining to next hops C, D, C, and D, respectively. Other embodiments of the invention may exist where the order of next hops is presented differently without departing from the scope of the invention. However, the equal (or substantially equal) distribution of the remaining next hops takes precedence, thereby retaining load balancing of the network traffic across the remaining next hops.

Those skilled in the art will appreciate that while various embodiments of the invention describe the distribution of NHI for various nexthops equally (or substantially equally) across a NHG, the invention is not limited to such distribution of NHI. Rather, embodiments of the invention, may be implemented in which there is not equal or substantially equal distribution of NHI for various next hops within a NHG. Further, depending on the number of next hops associated with a given NHG and the number of NHEs in a NHG, the distribution of NHI for the given next hops across the NHEs in the NHG may only roughly approximate an even/equal distribution across next hops.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network device comprising a processor, wherein the processor is configured to perform a method, comprising:
   receiving first next hop information that specifies a second network device and a first egress port of the network device;
   populating every entry of a plurality of entries in a next hop group with the first next hop information, wherein a prefix is associated with a forwarding equivalence class (FEC) index and wherein the FEC index is associated with the next hop group;
   receiving a first packet;
   making a first determination that the first packet is associated with the prefix; and
   based on the first determination, processing the first packet using the next hop group.

2. The network device of claim 1, wherein the method further comprises:
   receiving second next hop information that specifies a third network device and a second egress port of the network device;
   making a second determination that the second next hop information is associated with the next hop group;
   based on the second determination, overwriting contents of a first subset of the plurality of entries with the second next hop information; and
   after overwriting the contents of the first subset:
      receiving a second packet;
      making a third determination that the second packet is associated with the prefix; and
      based on the third determination, processing the second packet using the next hop group.

3. The network device of claim 2, wherein the method further comprises:
   receiving third next hop information that specifies a fourth network device and a third egress port of the network device;
   making a fourth determination that the third next hop information is associated with the next hop group;
   based on the fourth determination, identifying a second subset of the plurality of entries, wherein a first entry of the second subset of the plurality of entries comprises the first next hop information and a second entry of the second subset of the plurality of entries comprises the second next hop information;
   overwriting contents of the second subset of the plurality of entries with the third next hop information; and
   after overwriting the contents of the second subset set:
      receiving a third packet;
      making a fifth determination that the second packet is associated with the prefix; and
      based on the fifth determination, processing the third packet using the next hop group.

4. The network device of claim 2, wherein the method further comprises:
   making a fourth determination to remove the second next hop information from the first subset of the plurality of entries; and
   based on the fourth determination, overwriting the contents of the first subset of the plurality of entries with the first next hop information.

5. The network device of claim 2, wherein a cardinality of the first subset of the plurality of entries is based on a cardinality of unique next hop information associated with the next hop group.

6. A method for programming a route-deciding network device, comprising:
   receiving, by the route-deciding network device, next hop information;
   identifying a next hop group associated with the next hop information; and
   modifying the next hop group based on the next hop information.

7. The method of claim 6, wherein the next hop information indicates a new network device and forwarding information associated with the new network device.

8. The method of claim 7, wherein modifying the next hop group comprises:
   updating the next hop group to include the forwarding information associated with the new network device.

9. The method of claim 8, wherein the next hop group comprises a plurality of entries associated with a plurality of existing network devices, and wherein updating the next hop group comprises:
- obtaining a number of existing network devices of the plurality of existing network devices;
- determining, based on the number of existing network devices, overwrite entries of the plurality of entries; and
- overwriting the overwrite entries with the forwarding information associated with the new network device.

10. The method of claim 9, wherein after overwriting the overwrite entries, the plurality of existing network devices comprises the new network device.

11. The method of claim 10, wherein the plurality of entries comprises forwarding information that is are proportional to each network device of the plurality of existing network devices.

12. The method of claim 11, wherein the overwrite entries are evenly distributed throughout the next hop group.

13. A non-transitory computer readable medium, comprising instructions that, when executed by a processor, perform a method of programming a route-deciding network device, wherein the method comprises:
- receiving, by the route-deciding network device, next hop information;
- identifying a next hop group associated with the next hop information; and
- modifying the next hop group based on the next hop information.

14. The non-transitory computer readable medium of claim 13, wherein the next hop information indicates a new network device and forwarding information associated with the new network device.

15. The non-transitory computer readable medium of claim 14, wherein modifying the next hop group comprises:
- updating the next hop group to include the forwarding information associated with the new network device.

16. The non-transitory computer readable medium of claim 15, wherein the next hop group comprises a plurality of entries associated with a plurality of existing network devices, and wherein updating the next hop group comprises:
- obtaining a number of existing network devices of the plurality of existing network devices;
- determining, based on the number of existing network devices, overwrite entries of the plurality of entries; and
- overwriting the overwrite entries with the forwarding information associated with the new network device.

17. The non-transitory computer readable medium of claim 16, wherein after overwriting the overwrite entries, the plurality of existing network devices comprises the new network device.

18. The non-transitory computer readable medium of claim 17, wherein the plurality of entries comprises forwarding information that is proportional to each network device of the plurality of existing network devices.

19. A method for programming a route-deciding network device, comprising:
- receiving, by the route-deciding network device, next hop information, wherein the next hop information indicates removal of a removed network device;
- identifying a next hop group associated with the next hop information; and
- modifying the next hop group based on the next hop information.

20. The method of claim 19, wherein modifying the next hop group comprises:
- updating the next hop group to remove forwarding information associated with the removed network device.

21. The method of claim 20, wherein the next hop group comprises a plurality of entries associated with a plurality of existing network devices and the removed network device, and wherein updating the next hop group comprises:
- removing all forwarding information associated with the removed network device from the plurality of entries; and
- removing the removed network device from the plurality of existing network devices.

22. The method of claim 21, wherein updating the next hop group further comprises:
- adding new forwarding information of each existing network device, of the plurality of existing network devices, to the plurality of entries.

23. The method of claim 22, wherein the new forwarding information is proportionally associated with each existing network device of the plurality of existing network devices.

24. The method of claim 23, wherein identifying the next hop group associated with the next hop information comprises:
- identifying a prefix associated with the removed network device; and
- identifying, in a forwarding information base, a forwarding equivalence class index associated with the prefix.

25. The method of claim 24, wherein identifying the next hop group associated with the next hop information further comprises:
- identifying, in a forwarding equivalence class table, the next hop group associated with the forwarding equivalence class index.

* * * * *